March 12, 1957  E. LEVY, JR  2,785,370
DUAL REGULATING CIRCUIT
Filed Oct. 26, 1953  2 Sheets-Sheet 1

ERNEST LEVY, JR.
INVENTOR

BY Ralph E. Bitner
ATTORNEY

March 12, 1957　　　　　E. LEVY, JR　　　　　2,785,370
DUAL REGULATING CIRCUIT

Filed Oct. 26, 1953　　　　　　　　　　　　　　2 Sheets-Sheet 2

ERNEST LEVY, JR.
INVENTOR

BY Ralph E. Bitner
ATTORNEY

United States Patent Office 2,785,370
Patented Mar. 12, 1957

2,785,370

DUAL REGULATING CIRCUIT

Ernest Levy, Jr., Bronx, N. Y., assignor to Sorensen & Company, Inc., Stamford, Conn., a corporation of Connecticut Application October 26, 1953, Serial No. 388,108

5 Claims. (Cl. 321—2)

This invention relates to a voltage regulator which includes two systems for controlling the alternating current voltage across a load circuit. It has particular reference to a system of regulation which employs a single voltage sensing device and two methods of compensating for voltage changes, thereby reducing the weight of the system and lowering the wave form distortion.

Regulation of alternating current supply circuits generally includes a saturable reactor for varying an impedance in series with the supply circuit. While this arrangement produces the desired voltage regulation the wave form distortion is generally large in comparison to other types of regulating systems and it further requires comparatively large and heavy inductance units. The present type of voltage regulator employs a single saturable reactor which is small and is not required to carry the full load current. The present invention also includes a grid controlled rectifier circuit which permits voltage regulation by altering the voltage applied to the control electrodes of the rectifier tubes. The present circuit also includes a standard oscillator and therefore the voltage regulator delivers a stabilized frequency wave to the load which is independent of the frequency of the supply line.

One of the objects of this invention is to provide an improved voltage regulator which avoids one or more of the disadvantages and limitations of prior art arrangements.

Another object of the invention is to provide a voltage regulator which can be adjusted to produce an alternating current having a stabilized frequency.

Another object of the invention is to reduce the weight of voltage regulators by lowering the size and weight of iron cored coils necessary for the regulator operation.

Another object of the invention is to reduce the wave form distortion of the regulator circuit.

The invention comprises an input circuit for connection to a source of alternating current power which may vary in voltage and frequency. A grid controlled rectifier receives power from the supply and produces a direct current, the voltage of which is regulated by a control circuit which in turn is controlled by a sensing circuit connected across the load terminals. The direct current power from the rectifier is applied to an inverter circuit which generates alternating current and which is connected directly to the load circuit. The inverter is controlled by an oscillator circuit to produce the desired frequency and is further controlled by a saturable reactor connected across its output circuit. The saturable reactor is changed by the control circuit to produce a constant voltage at the load terminals.

For a better understanding of the present invention, together with other and further objects thereof, reference is made to the following description taken in connection with the accompanying drawings.

Figure 1:
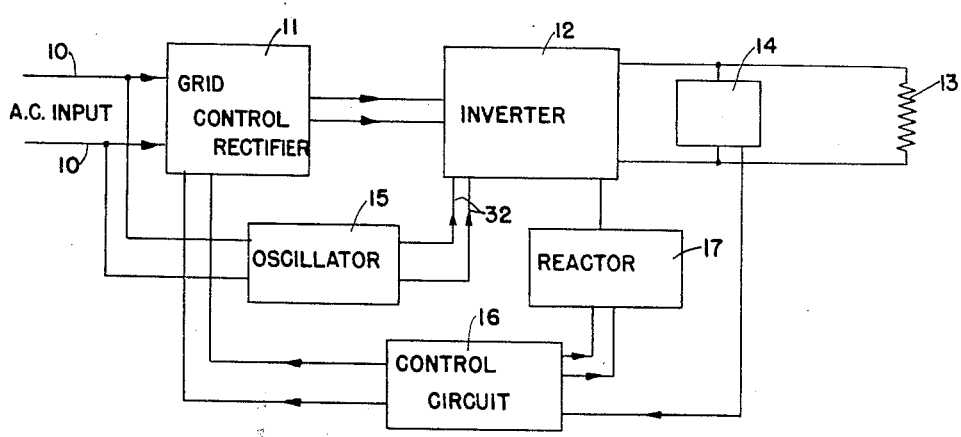
Fig. 1 is a circuit diagram of a voltage regulator with the components shown in block form.

Referring now to Fig. 1, input terminals 10, 10 are for connection to an alternating current power supply which may be variable in both frequency and voltage. A grid controlled rectifier 11 is connected to the supply line and provides direct current which is applied to an inverter circuit 12. The output of the inverter circuit is connected to a load 13 and a sensing circuit 14 is also connected across the load to determine the value of the load voltage.

And oscillator circuit 15 is also connected across the input terminals 10, 10 and provides a stabilized frequency wave which is applied to the inverter circuit 12 to control its frequency. The sensing device 14 is connected to a control circuit 16 which is essentially a direct current amplifier. Control circuit 16 has two output circuits one of which is applied to the direct current winding of a saturable reactor 17, the other being connected to the grid controlled rectifier for controlling the direct current bias of the grids in the rectifier circuit 11.

Figure 2:
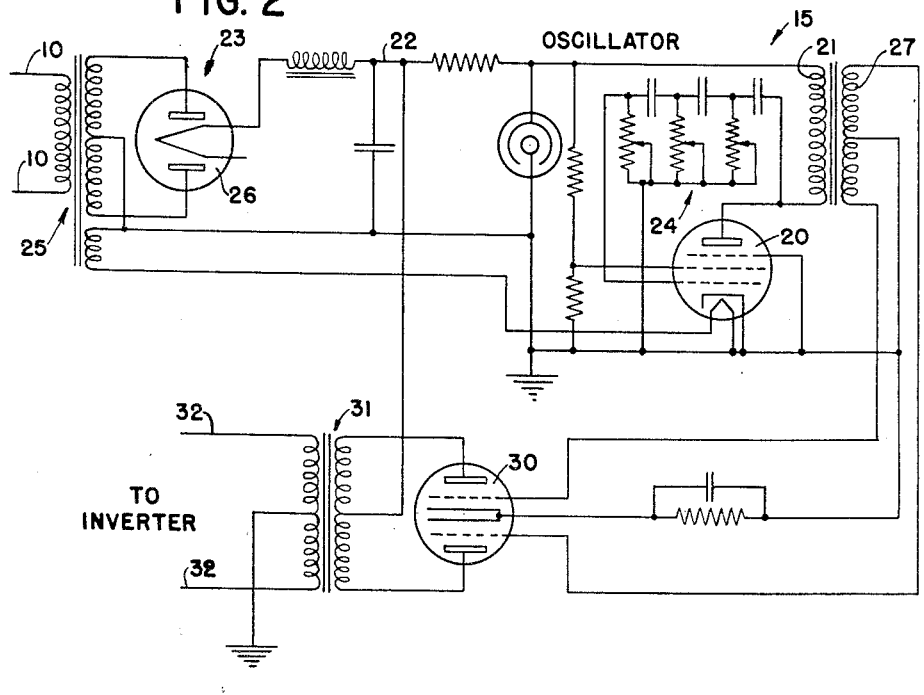
Fig. 2 is a schematic diagram of connections showing the oscillator circuit together with its power supply and output amplifier.

The schematic diagram of connections in Fig. 2 shows the details of oscillator circuit 15. An oscillator tube 20 has its anode connected in series with a primary transformer winding 21 and a positive supply conductor 22 which is connected to a rectifier circuit 23. The oscillator circuit 15 may be any type of oscillator, not necessarily a vacuum tube arrangement. The present circuit is an example of an arrangement which works well in practice and contains a delay line 24 which is adjustable and includes three capacitors and three resistors. This type of oscillator is well known and details regarding its use and operation may be found in any good standard handbook. Power supply for the oscillator is derived from a rectifier circuit 23 which comprises a transformer 25 and a rectifier tube 26. The secondary winding 27 of the output transformer is connected to two control grids in a double triode amplifier tube 30. The output circuit of tube 30 includes a transformer 31, the primary winding of which is connected to two anodes in tube 30 and the secondary winding of which is connected to conductors 32, 32 which are applied directly to the control grids in the inverter circuit 12.

Figure 3:
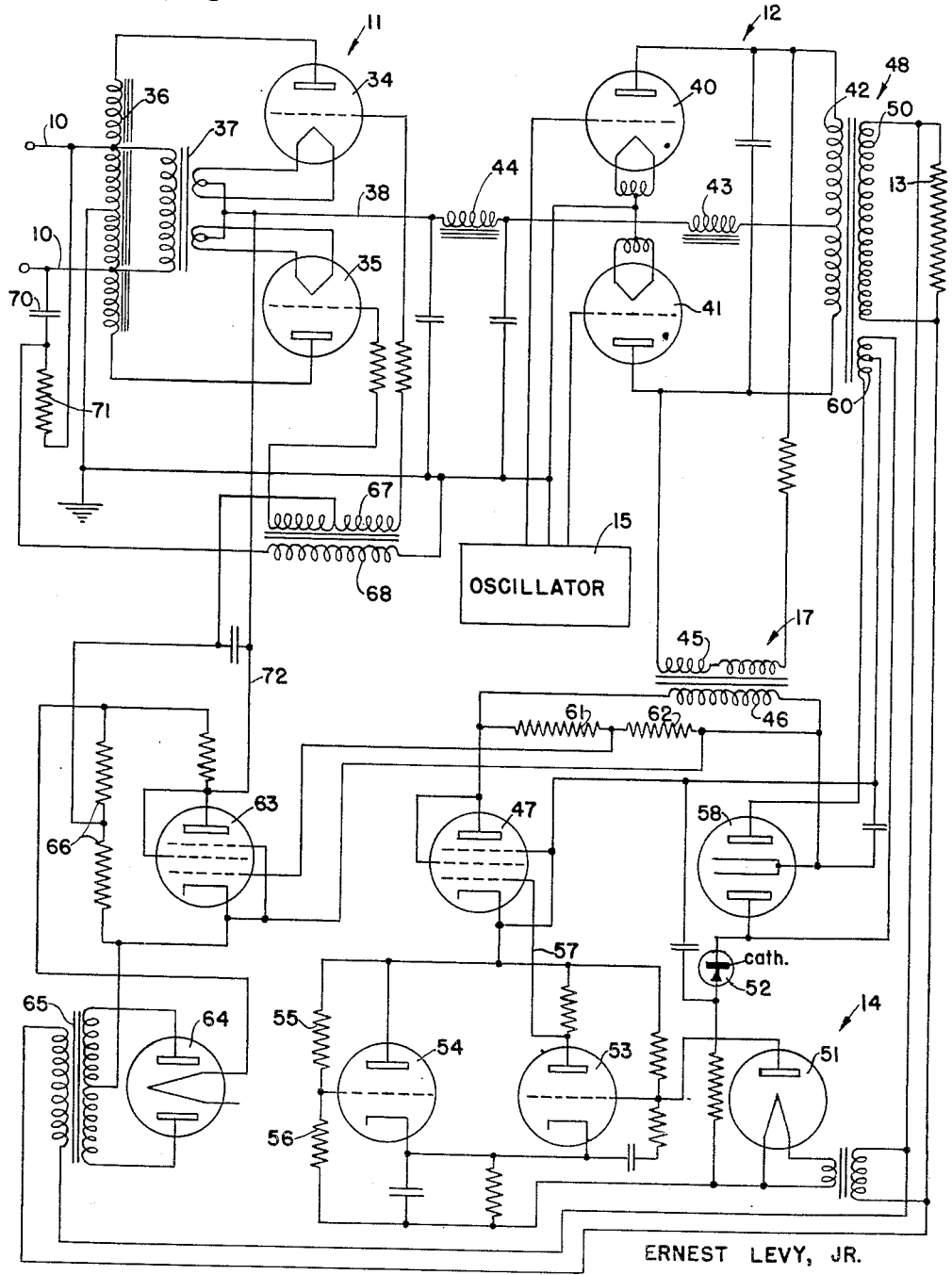
Fig. 3 is a schematic diagram of connections of the entire circuit showing the oscillator circuit in block.

The circuit shown in Fig. 3 includes details of the rectifier circuit 11, the inverter circuit 12, the control circuit 16, and the sensing circuit 14. The rectifier circuit 11 contains two rectifier tubes 34, 35, the anodes of these tubes being connected to opposite ends of an auto-transformer winding 36. The alternating current supply line is connected to a portion of winding 36 and the input line is also connected to a step-down transformer 37 which supplies current to the filaments of tubes 34 and 35. The output circuit of the rectifier comprises a conductor 38 which carries a positive direct current potential and is connected to the mid-point of the two secondary windings of transformer 37. The negative conductor is connected to the mid-point of winding 36.

The inverter circuit 12 comprises two gas-filled triodes 40 and 41 having their control electrodes connected to the output of the oscillator circuit 15. The anodes of tubes 40 and 41 are connected to the terminals of a transformer winding 42, the mid-point of which is connected through an inductance 43 and a filter circuit 44 to the positive supply conductor 38 forming the output circuit of rectifier 11.

The frequency of the inverter circuit output wave is fixed by the oscillator 15 which may be a precision device designed to hold the frequency of the output power within very close limits. The magnitude of the power output from the inverter circuit may be controlled by a variable inductance 17. This inductance comprises a winding 45 which is bridged across the two anodes in the inverter circuit. The inductance of this winding is controlled by a direct current winding 46 which is connected in the anode circuit of an amplifier tube 47. Winding 42 forms the primary of an output transformer 48 having a secondary winding 50 which is connected to the load 13.

The sensing device 14 which is connected across the load terminals comprises a filamentary diode 51 the filament of which is coupled to the load circuit. The diagram of connections in Fig. 3 shows a transformer coupling but it should be understood that any other form of coupling between the output circuit and the filament may be used. Positive direct current potential for the anode of diode 51 is obtained from a rectifier unit 52 and the resistance between the anode and cathode of diode 51 is the controlling element which changes the inductance of winding 45 and changes the direct current bias on the control electrodes of rectifier units 34 and 35.

The anode of tube 51 is connected directly to the control electrode of an amplifier tube 53 while the filament of the diode 51 is connected directly to the cathode circuit of the amplifier tube. Amplifier tube 53 is coupled to another amplifier tube 54 by cathode resistance coupling. The control electrode of tube 54 is connected to a voltage divider having two resistor components 55 and 56, thereby forming a bridge circuit, the output of which is applied over conductor 57 to the control electrode of amplifier tube 47. The direct current potential for the anode of tube 47 is obtained from a rectifier circuit which includes a double diode 58 and a transformer winding 60 on the core of transformer 48.

The operation of the above described circuit is similar to other well known circuits such as the circuit described in Patent No. 2,569,500, issued to E. M. Sorensen, Oct. 2, 1951.

Part of the anode current from tube 47 passes through two resistors 61 and 62, thereby forming a voltage divider, one branch of which is connected to the cathode and control electrode of an amplifier pentode 63. This tube receives its anode power from a separate rectifier circuit which consists of a double diode 64 and a transformer 65, the primary of which is connected directly across the load terminals. The output circuit of tube 63 is connected to the anode of tube 63 and the midpoint of a voltage divider 66 which is bridged across the anode-cathode circuit. The other terminals of the output circuit are connected to the mid-point of the rectifier filament transformer secondaries and the midpoint of a secondary winding 67. The terminals of winding 67 are connected to the control electrodes of rectifier tubes 34 and 35. The primary winding 68 is connected between the mid-point of winding 36 and the junction point of a phase transforming circuit which includes a capacitor 70 and a resistor 71. The terminals of this circuit are connected across the alternating current supply line and produce a change of phase for the rectifier control electrodes so that a change in bias potential applied over conductor 72 to the mid-point of winding 67 will have a more positive control on the rectifier output voltage.

The operation of this circuit is similar to the circuit described above. A change in load voltage produces a change in the filament temperature of diode 51 which in turn changes the tube resistance and the voltage applied to the control electrode of amplifier 53. This change produces a change in voltage on conductor 57 and alters the current through the anode circuit of pentode 47 and the current through resistors 61 and 62. This change in current alters the voltage on the control electrode of amplifier tube 63 and thereby changes the voltage on conductor 72 and the rectifier control electrodes.

From the above description it will be obvious that a rectifier inverter circuit may be stabilized in voltage and frequency by employing a stabilized oscillator for the inverter circuit and using a single sensing means for determining the voltage variations across the load. The single sensing means is connected through an amplifier circuit to two control circuits, one operating on the output of the inverter circuit and the other operating on the control electrodes in the rectifier circuit.

While there have been described specific embodiments of the invention, it will be obvious that various changes and modifications may be made in the above described method without departing from the field of the invention which should be limited only by the scope of the appended claims.

I claim:

1. An alternating current voltage regulator comprising, a rectifier circuit for changing an alternating current supply into direct current, an inverter circuit connected to an output portion of the rectifier circuit for changing the direct current to alternating current, a sensing circuit coupled to an alternating current output circuit of the inverter which is responsive to alternating voltages above or below a predetermined output voltage, an amplifier circuit coupled to the sensing circuit for receiving and amplifying voltages produced by an output circuit portion of said sensing circuit, circuit means for applying a first electrical output of the amplifier circuit to control electrodes in electron discharge devices in the rectifier circuit and a second output of said amplifier to a control winding of a saturable reactor connected across the output circuit of the inverter, said first and second outputs for controlling the rectifier and inverter to maintain the alternating current output of the inverter within a restricted range of voltage values.

2. An alternating current voltage regulator comprising, a rectifier circuit having input terminals for connections to an alternating current supply which may vary in voltage and frequency and having output terminals for delivering direct current power, an inverter circuit having input terminals connected to said rectifier output terminals which changes direct current power into alternating current power and delivers the alternating current power to an inverter output circuit, a sensing circuit coupled to the inverter output circuit which is responsive to alternating voltages above or below a predetermined output voltage, an amplifier circuit coupled to the sensing circuit for receiving and amplifying voltages produced by an output circuit portion of said sensing circuit, circuit means for applying a first electrical output of the amplifier circuit to control electrodes in electron discharge devices in the rectifier circuit and a second output of said amplifier to a control winding of a saturable reactor connected across the output circuit of the inverter, said first and second outputs for controlling the rectifier and inverter to maintain the alternating current output of the inverter within a restricted range of voltage values.

3. An alternating current voltage regulator comprising, a rectifier circuit having input terminals for connection to an alternating current supply which may vary in voltage and frequency and having output terminals for delivering direct current power, an inverter circuit having input terminals connected to said rectifier output terminals which changes direct current power into alternating current power and delivers the alternating current power to an inverter output circuit, a sensing circuit coupled to the inverter output circuit which is responsive to alternating voltages above or below a predetermined output voltage, an amplifier circuit coupled to the sensing circuit for receiving and amplifying voltages produced by an output circuit portion of said sensing circuit, an oscillator connected to the inverter circuit for controlling the frequency of the inverter output, circuit means for applying a first electrical output of the amplifier circuit to control electrodes in electron discharge devices in the rectifier circuit and a second output of said amplifier to a control winding of a saturable reactor connected across the output circuit of the inverter, said first and second outputs for controlling the rectifier and inverter to maintain the alternating current output of the inverter within a restricted range of voltage values.

4. An alternating current voltage regulator comprising, a rectifier circuit for changing an alternating current supply into direct current, said circuit having input terminals for connection to an alternating current supply which may vary in voltage and frequency and having output terminals for delivering direct current power, said rectifier circuit also including two electron discharge devices each having a control electrode which controls the amount of current passing through the devices, an inverter circuit having input terminals connected to said rectifier output terminals which change direct current power into alternating current power and delivers the alternating current power to an inverter output circuit, said inverter circuit including two gaseous discharge devices each having a control electrode which controls the time an electrical discharge is started through the device, a sensing circuit coupled to the inverter output circuit which is responsive to alternating voltages above or below a predetermined output voltage, an amplifier circuit coupled to the sensing circuit for receiving and amplifying voltages produced by an output circuit portion of said sensing circuit, circuit means for applying a first electrical output of the amplifier circuit to control electrodes in electron discharge devices in the rectifier circuit and a second output of said amplifier to a control winding of a saturable reactor connected across the output circuit of the inverter, said first and second outputs for controlling the rectifier and inverter to maintain the alternating current output of the inverter within a restricted range of voltage values.

5. An alternating current voltage regulator in accordance with claim 4 in which said sensing circuit includes a filamentary diode and a four armed bridge circuit having three resistors as three of the arms thereof, and the diode as the fourth arm, said filament coupled to the output circuit of said inverter, and circuit means which couples the amplifier input circuit to two opposite terminals on the bridge.

No references cited.